United States Patent
Colla et al.

(10) Patent No.: US 10,963,278 B2
(45) Date of Patent: Mar. 30, 2021

(54) SYSTEMS AND METHODS FOR GENERATING A NETWORK TOPOLOGY AND MONITORING CHANGES IN THE NETWORK TOPOLOGY OF A DATA CENTER

(71) Applicant: Alcatel-Lucent USA, Inc., Murray Hill, NJ (US)

(72) Inventors: Sergio Colla, San Jose, CA (US); Bill Leung, San Jose, CA (US); Tuan Nguyen, San Jose, CA (US); Nihal Singh, San Jose, CA (US); Rajesh Shenoy, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 148 days.

(21) Appl. No.: 14/706,015

(22) Filed: May 7, 2015

(65) Prior Publication Data

US 2016/0328256 A1 Nov. 10, 2016

(51) Int. Cl.
*G06F 9/455* (2018.01)
*G06F 11/30* (2006.01)
*G06F 9/50* (2006.01)

(52) U.S. Cl.
CPC ........ *G06F 9/45558* (2013.01); *G06F 9/5072* (2013.01); *G06F 11/30* (2013.01); *G06F 11/301* (2013.01); *G06F 11/3013* (2013.01); *G06F 11/3055* (2013.01); *G06F 11/3089* (2013.01); *G06F 2009/45562* (2013.01); *G06F 2009/45591* (2013.01); *G06F 2209/508* (2013.01)

(58) Field of Classification Search
None
See application file for complete search history.

(56) References Cited

U.S. PATENT DOCUMENTS

| 7,657,545 B2* | 2/2010 | Bird | G06F 17/30601 705/7.37 |
| 2015/0043378 A1* | 2/2015 | Bardgett | H04L 12/4641 370/254 |

OTHER PUBLICATIONS

Galis et al,Management and Service-aware Networking Architectures (MANA) for Future Internet, 2009.
Ceccarelli et al, Framework for Abstraction and Control of Transport Networks, Dec. 2014, IETF.
FIA-Prague, Management and Service-aware Networking Architectures (MANA) Session, May 12, 2009, Agenda, Report, Executive Summary.

* cited by examiner

Primary Examiner — Bing Zhao
(74) Attorney, Agent, or Firm — Capitol Patent & Trademark Law Firm, PLLC

(57) ABSTRACT

The topology and operation of virtual entities and sub-entities of a data center may be monitored and correlated to services and customers supported by the data center.

21 Claims, 1 Drawing Sheet

TOR: TOP OF THE RACK SWITCH
VSC: VIRTUAL SWITCH CONTROLLER
VSW: VIRTUAL SWITCH
VM: VIRTUAL MACHINE
—: EXISTING TUNNELS – 5a TO 5n
—: NEWLY DEDUCED TUNNELS – 6a TO 6n

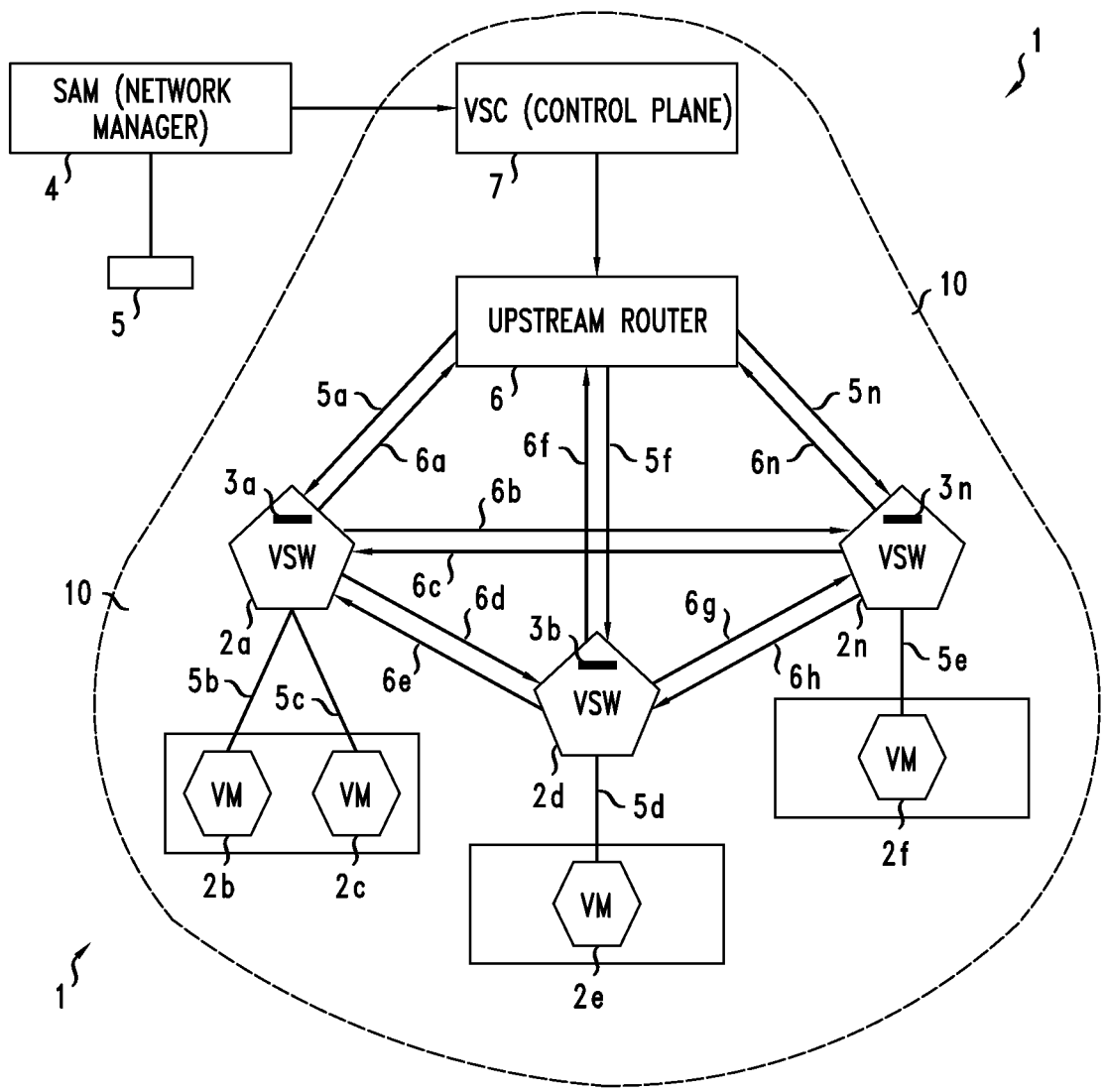

SYSTEMS AND METHODS FOR GENERATING A NETWORK TOPOLOGY AND MONITORING CHANGES IN THE NETWORK TOPOLOGY OF A DATA CENTER

INTRODUCTION

Existing data centers include entities that may be implemented via software running on one or more hardware servers, routers, personal computers (PCs) or similar devices. Existing network management tools used to monitor such entities are neither capable of easily identifying the entire topology of a data center that includes such entities and sub-entities, nor capable of timely identifying failures in a data center that includes such entities and sub-entities.

SUMMARY

Exemplary embodiments of systems and methods for monitoring a data center are described herein.

According to one embodiment, an inventive data center element (e.g., router, server) that may be used in monitoring a data center may comprise a computing platform, where the platform may comprise a specially programmed processor operable to execute instructions stored in an associated memory to configure the platform as one or more virtual entities (e.g., virtual switches, virtual machines), each entity comprising a configured agent operable to complete one or more integrated processes. The integrated processes allow the agent to collect information associated with one or more configured virtual entities and sub-entities of the virtual entity, and communicate with a controller to send the collected information to the controller.

The information collected by the agent may comprise: initial connection information, initial status information, or initial tunneling information or some combination of the initial connection, status and tunneling information; and revised connection information, revised status information, or revised tunneling information or some combination of the revised connection, status and tunneling information.

In another embodiment the data center element may be part of a system for monitoring a data center. In addition to the element the system may include a controller, such as a service aware management controller, for example.

In one embodiment the controller may also comprise a specially programmed processor operable to execute instructions stored in an associated memory to complete one or more integrated processes. Such processes may include, for example, receiving information from one or more configured agents associated with one or more configured virtual entities of a data center, and parsing the received information to generate a mesh network topology of the data center and to correlate the generated mesh network topology with one or more services and customers supported by the data center.

The information received by the controller is similar to the information sent by the agent described above, namely: initial connection information, initial status information, or initial tunneling information or some combination of the initial connection, status and tunneling information; and revised connection information, revised status information, or revised tunneling information or some combination of the revised connection, status and tunneling information, to name some examples of exemplary types of information.

In addition to receiving information from configured agents the controller may receive information (e.g., connection and/or status information) from one or more non-virtual elements (e.g., router, ports of a router or a controller) of one or more hypervisors or control entities of the data center. Upon receiving information from one of these additional sources the controller may be further operable to parse the received information to generate a mesh network topology, and then correlate the generated mesh network topology with one or more services and customers supported by the data center.

Among the specific information a controller may receive from an agent, non-virtual entity, hypervisor, control entity or element are "triggers" or similar signals indicating a failure within a data center. Some examples of failures are: a pathway failure, tunnel failure, virtual entity failure, non-virtual element failure, and a sub-virtual entity failure. Accordingly, the controller may be further operable to execute instructions stored in an associated memory to complete one or more integrated processes comprising: parsing the received information to identify entities, elements and pathways of a generated topology that are known to be affected by a failure in the data center, and correlating the identified entities, elements and pathways with one or more services and customers supported by the data center that are known to be affected by the failure.

Herein, when used to describe a failure, the word "known" is meant to identify those entities, elements, pathways, etc., of a generated topology that are most likely located, or otherwise considered to be, at the same hierarchical level as an existing, identified failure.

In addition to identifying those parts of a data center that are known to be affected by a failure, controllers provided by embodiments of the present invention may be operable to execute stored, integrated processes for determining the effect of this failure on additional entities, pathways/tunnels of the data center (e.g., those failures, entities, tunnels, pathways, etc., that may occur at hierarchically lower or higher virtualized or non-virtualized levels than the existing, identified failure). That is, once a controller has received information concerning an existing failure, controllers provided by the present invention may further identify any potential failures that may occur in a data center, the entities and pathways that may be potentially affected as well as the services and customers supported by the data center that may be potentially affected, for example.

To do so, in one embodiment the controller may be operable to execute instructions stored in an associated memory to complete one or more integrated processes comprising: parsing the received information to identify entities, elements and pathways of the generated mesh network topology that may be potentially affected by the failure in the data center, and correlating the potentially identified entities, elements and pathways with one or more services and customers supported by the data center that may be potentially affected.

In yet a further embodiment a system provided by the present invention may include an element, controller and a graphical user interface (GUI) operable to control an optional display of one or more virtual nodes (virtual entities, such as a virtual switch) of a data center.

In addition to the inventive systems described above and herein, the present inventors also provide related methods for monitoring a data center. One such exemplary method comprises collecting information associated with one or more configured virtual entities or sub-entities of the virtual entity (e.g. virtual switches, virtual machines), and sending the collected information to a controller, where the information comprises: initial connection information, initial status information, or initial tunneling information or some combination of the initial connection, status and tunneling information; and revised connection information, revised status information, or revised tunneling information or some combination of the revised connection, status and tunneling information, to name some examples of exemplary types of information.

A second, exemplary method for monitoring a data center may comprise receiving information from one or more configured agents associated with one or more configured virtual entities of a data center, and parsing the received information to generate a mesh network topology of the data center and to correlate the generated mesh network topology with one or more services and customers supported by the data center, where, as described above, the information received from the one or more agents may again comprise: initial connection information, initial status information, and initial tunneling information or some combination of the initial connection, status and tunneling information; and revised connection information, revised status information, and revised tunneling information or some combination of the revised connection, status and tunneling information. In addition to methods for receiving information from configured agents the present inventors provide additional embodiments where information (e.g., connection and status information) may be received from one or more non-virtual elements (e.g., router, ports of a router or a controller) or one or more hypervisors or control entities of the data center. In particular such methods may comprise receiving information from one or more non-virtual or one or more hypervisors or control entities, and parsing the received information to generate a mesh network topology, and to correlate the generated mesh network topology with the one or more services and customers supported by the data center.

As noted above and herein, "triggers" or similar signals indicating a failure within a data center may be sent to a controller or the like. Accordingly, yet an additional method may comprise parsing received information (e.g., triggers) to identify entities, elements and pathways of a generated topology that are known to be affected by the failure in a data center, and correlating the identified entities, elements and pathways with one or more services and customers supported by the data center that are known to be affected by the failure. Some examples of failures are a pathway failure, tunnel failure, virtual entity failure, non-virtual element failure, and a sub-virtual entity failure.

In addition to methods for identifying those parts of a data center that are known to be affected by a failure, the present inventors provide methods for determining the effect of a failure on additional entities, pathways/tunnels of the data center (e.g., those that may occur at a hierarchically lower or higher virtualized or non-virtualized level than an existing, identified failure) due to an existing failure. That is, methods provided by the present invention may further identify any potential failures that may occur in a data center, the entities and pathways that may be potentially affected as well as the services and customers supported by the data center that may be potentially affected.

One such exemplary method may comprise parsing received information to identify entities, elements and pathways of the generated topology that may be potentially affected by a failure in a data center, and correlating the potentially identified entities, elements and pathways with one or more services and customers supported by the data center that may be potentially affected.

In yet a further embodiment each of the above described methods may use a GUI or a similar system or device to control the display of one or more virtual nodes (virtual entities, such as a virtual switch) of a data center.

Additional embodiments and features will be apparent from the following detailed description and appended FIGURES.

BRIEF DESCRIPTION OF THE FIGURES

FIG. 1 depicts a simplified block diagram of a system according to one or more embodiments of the invention.

DETAILED DESCRIPTION, WITH EXAMPLES

Exemplary embodiments of systems and methods for monitoring a data center are described herein and are shown by way of example in the FIGURES. Throughout the following description and FIGURES, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be understood that one or more exemplary embodiments may be described as a method. Although a method may be described as sequential, it should be understood that such a method may be performed in parallel, concurrently or simultaneously. In addition, the order of each step within a method may be re-arranged. A method may be terminated when completed, and may also include additional steps not included in a description of the method.

As used herein, the term "and/or" includes any and all combinations of one or more of the associated listed items. As used herein, the singular forms "a," "an" and "the" are intended to include the plural form, unless the context and/or common sense indicates otherwise. It should be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

When used herein the term "collect" or its many tenses includes, but is not limited to, the detection of physical signals, and/or the physical computation of operating parameters, additional data, and additional signals occurring within a data center.

When used herein the term "pathway" includes physical connections as well as connections between instantiated virtual entities known as "tunnels". Conversely, while a pathway may include a tunnel, when used herein the term "tunnel" refers to a connection between two (or more) instantiated virtual entities.

When used herein the term "entity" means virtual and non-virtual entities unless specifically indicated otherwise or as dictated by the context of the description or claims, and the term "sub-entity" means virtual and non-virtual sub-entities unless specifically indicated otherwise or as dictated by the context of the description or claims.

It should be understood that when a system, device, platform, entity, sub-entity or element is referred to as being "connected" (or other tenses of connected) to another system, device, platform, entity, sub-entity or element or "installed" or "used" (or another tense of installed or used)

in another system, device, platform, entity, sub-entity or element such systems, such devices, platforms, entities, sub-entities or elements can be directly connected, installed or used in, other or intervening systems, devices, platforms, entities, sub-entities or elements to aid a connection, installation or usage. However, if the intervening systems, devices, platforms, entities, sub-entities and elements are well known to those in the art they may not be described herein.

As used herein the phrase "data center" means one or more network elements, entities and sub-entities in a portion or portions of a data center or one or more network elements, entities and sub-entities in an entire data center.

As used herein, the term "embodiment" refers to an example of the present invention.

Turning to FIG. 1 there is depicted a simplified block diagram of a system 1 for monitoring one or more instantiated virtual entities 2a, 2b, . . . 2n (where "n" is the last entity) and sub-entities of a data center 10 according to one embodiment. For the sake of clarity, sub-entities are not depicted in FIG. 1. In accordance with embodiments of the present invention, the system 1 may include a controller 4, such as a service aware management controller, for example, that includes one or more specially programmed processors (not shown) operable to execute instructions stored in one or more associated memories to complete one or more stored, integrated processes related to the inventive functions and provide the inventive features described herein as well as complete and provide functions and features that are well known to those skilled in the art. For the sake of brevity, the description that follows will not repeatedly refer to the processors and memories though it should be understood that these components may be used to provide the functions and features embodied in exemplary controllers of the present invention.

For example, in embodiments of the present invention the controller 4 may be operable to execute such integrated processes to receive SNMP information stored by a top of rack, virtual switch controller (VSC) 7 in order to configure vertical and horizontal mesh networks within the mesh network topology of the data center 10, for example. In addition the controller 4 may be operable to execute integrated processes in order to receive initial or revised information from one or more configured agents 3a, 3b, . . . 3n (where "n" is the last agent) associated with one or more configured instantiated virtual entities 2a, 2b, . . . 2n of the data center 10 via an exchange of communications with the VSC 7, for example, and then parse the received information to, for example, identify specific entities, sub-entities, and pathways, in order to generate a vertical and horizontal mesh network topology of the data center 10 and correlate the generated vertical and horizontal mesh network topology with one or more services and customers supported by the data center 10. Each agent 3a, 3b, . . . 3n may be considered as a part of an element (e.g., router, server, controller) "witting" in a network within the data center 10 (e.g., installed and operating within) in order to "listen to" (i.e., collect) information exchanged between entities 2a, 2b, . . . 2n along "tunnels" 5a, 5b, . . . 5n and 6a, 6b, . . . 6n, and monitor the operation of entities 2a, 2b, . . . 2n and their connectivity to one another in both vertical and horizontal mesh networks. In embodiments of the invention, tunnels 6a, 6b, . . . 6n and their associated entities and sub-entities are pathways and associations that are newly "discovered" (e.g., identified, detected) y the systems and methods of the present invention as described in more detail herein.

In embodiments of the invention, upon parsing the received information to identify specific entities, sub-entities, and pathways, for example, the controller 4 may b e further operable to execute integrated processes in order to update or revise a mesh network topology mapping of the data center 10 based on the received, parsed information that is stored by the controller 10 or associated memory (e.g., database). For example, by comparing the received information with the stored mesh network topology the controller 4 may identify additional virtual entities, sub-entities, and pathways that have been created or torn down (i.e., removed) within the vertical and horizontal mesh network topology of data center 10 which, heretofore, could not be identified by existing techniques that do not use an agent "embedded" within (i.e., associated with) a virtual entity.

The VSC 7 may be operable to format and facilitate communications between the controller 4, an upstream router 6 and the one or more instantiated virtual entities 2a, 2b, . . . 2n, for example. As shown in FIG. 1 the entities 2a, 2b, . . . 2n may be implemented as virtual switches (VSWs) 2a, 2d, 2n and/or virtual machines (VMs) 2b, 2c, 2e, 2f though this is merely exemplary. Each of the VSWs may communicate with the VMs, which include virtual ports (not shown), that are supported by a routing protocol, such as border gateway protocol (BGP) and the like. The VSWs may communicate with each other via tunnels 5a, 5b, . . . 5n and 6a, 6b, . . . 6n. Each entity 2a, 2b, . . . 2n may form or comprise a vertical mesh network portion of the mesh network topology, while communications between the VSWs and the respective VMs may form or comprise a horizontal mesh network portion of the mesh network topology. It should be understood that embodiments of the invention described herein or their equivalents may be applied to multiple vertical and/or horizontal mesh networks forming the overall mesh network topology, such as those networks that are associated with multiple tenants/enterprises within a data center, or multiple departments associated with a particular tenant/enterprise, for example.

The use of the agents 3a, 3b . . . 3n provides a user responsible for monitoring the data center 10 with substantially more information regarding the initial and subsequent (i.e., revised) topologies and operation of the data center 10 than previously possible. In addition to providing substantially more information, the present invention also provides a user responsible for monitoring the data center 10 with substantially more ability to predict how the changes to, and operation of, the data center 10 may affect the services and customers supported by the data center 10 based on the information it receives.

With the above in mind, in one embodiment the controller 4 may be operable to execute stored, integrated processes in order to receive initial and subsequent or revised information (hereafter collectively referred to as "revised" information) from one or more of the configured agents 3a, 3b, . . . 3n related to the initial formation, and subsequent changes to, substantially all of the topology and operation of entities and sub-entities of the data center 10, generate a topology from such information and correlate the generated topology to services and customers supported by the data center 10, for example. One example of such information is tunneling information.

Specifically, therefore, the controller 4 may be operable to execute stored, integrated processes to receive initial and revised tunneling information from one or more of the configured agents 3a, 3b, . . . 3n related to the initial formation, and subsequent changes (e.g., tear down, failure, re-configuration of) to one or more tunnels and their associated horizontal mesh networks connecting multiple VMs across multiple VSWs, or related to one or more vertical mesh networks, for example.

Notably, heretofore, existing methods and systems were limited in their ability to obtain information about the formation and subsequent changes to the mesh network topology of a data center and operation of the entities and sub-entities within a data center. While existing methods and systems may be able to identify some of the vertical and horizontal mesh network topology of a data center, such methods were unable to identify substantially all of the mesh network topology (e.g., tunnels, entities, sub-entities) of a data center and unable to correlate that topology to services and customers supported by the data center, especially as the mesh network topology and operation of the data center changed over time.

As described herein, the addition of agents 3a, 3b, . . . 3n within a data center provides the ability to so identify substantially all of the vertical and horizontal mesh network topology and operation of a data center, such as data center 10 As indicated above for example, in one embodiment systems and methods provided by the present invention are capable of identifying tunnels 5a, 5b, . . . 5n and 6a, 6b, . . . 6n, respectively in FIG. 1, the mesh networks they belong to, any associated instantiated virtual entities and virtual sub-entities, and changes to such tunnels, mesh networks, entities, etc., in order to correlate any changes to such a mesh network topology to services and customers supported by the data center 10. Heretofore, the identification of tunnels 6a, 6b, . . . 6n, the mesh networks they belong to, and any associated instantiated virtual entities 2a, 2b, . . . 2n and virtual sub-entities and correlation of such a mesh network topology to services and customers supported by the data center 10, especially as the mesh network topology and operation of the data center 10 changed over time, would not be possible using existing systems and methods. That is, while existing systems and methods may be capable of identifying a small number of tunnels such existing systems and methods are unable to identify substantially all of such tunnels, the vertical and horizontal mesh networks they belong to, any associated virtual entities and virtual sub-entities and correlate such a vertical and horizontal mesh network topology to services and customers supported by the data center, especially as the mesh network topology and operation of the data center changed over time.

In more detail, in one embodiment, upon receiving initial or revised tunneling information from agents 3a, 3b . . . 3n concerning substantially all of the tunnels 5a, 5b, . . . 5n and 6a, 6n, . . . 6n within the topology of data center 10, the controller 4 may be further operable to execute stored, integrated processes to parse the received information to, for example, identify substantially all of the specific entities, sub-entities, and pathways, and generate a topology of the data center 10 that includes substantially all of the tunnels 5a, 5b, . . . 5n and 6a, 6b . . . 6n and mesh networks within data center 10, and correlate the so generated topology with one or more services and customers supported by the data center 10. upon parsing the received information to identify specific entities, sub-entities, and pathways, for example, the controller 4 may be further operable to execute integrated processes in order to update or revise a topology mapping of the data center 10 based on the received, parsed information that is stored by the controller 10 or associated memory (e.g., database). For example, the controller 4 may compare the received information with a stored topology in order to identify substantially all of the virtual entities, sub-entities, and pathways that have been created or torn down (i.e., removed) within data center 10 which, heretofore, could not be identified by existing techniques that do not use an agent associated with virtual entities.

In addition to tunneling information, the controller 4 may receive other types of information from the one or more agents 3a, 3b, . . . 3n upon instantiation, initialization or start-up of an entity 2a, 2b . . . 2n. For example, such information may comprise initial connection information, initial status information, initial tunneling information and/ or some combination of the initial connection, status and tunneling information, for example, from the agents 3a, 3b, . . . 3n. In addition, during operation of an entity 2a, 2b, . . . 2n the controller 4 may receive revised connection information, revised status information, revised tunneling information and/or some combination of the revised connection, status and tunneling information, for example, from the agents 3a, 3b, . . . 3n.

In addition to receiving information from the one or more configured agents 3a, 3b, . . . 3n associated with the one or more configured instantiated virtual entities 2a, 2b, . . . 2n the controller 4 may also receive initial and revised information (e.g., connection and status information) from one or more non-virtual entities (e.g., VSC 7, router 6, ports or interfaces of the router) of the data center 10. Accordingly, the controller 4 may be operable to execute instructions stored in an associated memory to complete one or more integrated processes comprising receiving information from one or more non-virtual entities of the data center 10 via an exchange of communications with the VSC 7 and router 6, for example, and parsing the received information from the one or more non-virtual entities to, for example, identify substantially all of the specific non-virtual entities and pathways using a similar comparison as described above, and to generate a topology. Such a generated topology may, therefore, include virtual entities and non-virtual entities. The information received by the controller 4 from virtual and non-virtual entities may be used to correlate a generated topology with one or more services and customers supported by the data center 10.

Still further, in addition to receiving information from the configured instantiated virtual entities and non-virtual entities the controller 4 may also receive initial and revised information from hypervisors or control entities of the data center (e.g., VSC 7). Accordingly, the controller 4 may be operable to execute instructions stored in an associated memory to complete one or more integrated processes comprising receiving initial and revised information from one or more hypervisors or control entities via an exchange of communications with the VSC 7, and router 6, for example, and parsing the received information from the one or more hypervisors or control entities to, for example, identify substantially all of the specific entities and pathways associated with such hypervisors and control entities using a similar comparison as described above, and to generate a topology. As before, the received information may also be used with the information received from the virtual and non-virtual entities (or some combination of the above) to generate a topology and to correlate the generated topology with one or more services and customers supported by the data center 10.

As noted above upon receiving information from the data center 10 the controller 4 may be operable to executed stored, integrated processes to, among other things, correlate a generated vertical and horizontal mesh network topology with one or more services and customers supported by the data center 10.

Among the specific information the controller 4 may receive from an agent 3a, 3b, . . . 3n (as well as from a non-virtual entity, hypervisor, control entity or element) are "triggers" or similar signals indicating a failure within the data center 10. Some examples of failures received from instantiated virtual entities 2a, 2b, . . . 2n are: a pathway failure, tunnel failure, virtual entity failure, non-virtual element failure, and a sub-virtual entity failure. Similarly, the controller 4 may receive similar triggers from non-virtual entities, hypervisor or control entities that indicate a pathway failure (where pathway includes a physical link or route failure), or a non-virtual entity failure, for example.

Generally speaking, upon receiving information (e.g., a trigger) concerning an existing failure and the entities affected, the controller 4 may be operable to execute stored, integrated processes for determining the effect of this failure on additional entities, pathways/tunnels of the data center 10 (e.g., those that may occur at a hierarchically lower or higher virtualized or non-virtualized level than an existing failure) due to the existing failure. That is, once the controller 4 has received information concerning an existing failure, the controller 4 may further identify any potential failures that may occur in the data center 10, the entities that may be potentially affected as well as the services and customers supported by the data center 10 that may be potentially affected.

To do so, in one embodiment the controller 4 may be operable to execute one or more stored, integrated processes to receive information that identifies an existing failure in the data center 10. Further, upon receiving the information the controller 4 may be operable to execute one or more stored, integrated processes to parse the received information to identify those entities, and pathways/tunnels of a generated vertical and horizontal mesh network topology that are known to be affected by the failure in the data center (e.g., those entities, elements, and pathways of a generated horizontal mesh network topology that are most likely located, or otherwise considered to be, at the same hierarchical level as an existing, identified failure), and to correlate the identified entities, and pathways/tunnels with one or more services and customers supported by the data center that are known to be affected by the failure.

Yet further, the controller 4 may be operable to execute one or more stored, integrated processes to parse the received information in order to identify entities, and pathways of the generated mesh network topology that may be potentially affected by the existing failure in the data center 10 (e.g., those that may occur at a hierarchically lower or higher virtualized or non-virtualized level than an existing failure, i.e., a portion of a vertical mesh network topology) and to correlate the potentially identified entities, and pathways/tunnels with one or more services and customers supported by the data center 10 that may potentially be affected.

In more detail, the controller 4 may be operable to execute one or more stored, integrated processes in order to access a topology mapping the controller 4 has generated and stored, for example. Thereafter, the controller 4 may be operable to execute stored, integrated processes in order to locate or otherwise identify the existing failure, any known entities and pathways associated with the failure and identify those additional entities and pathways/tunnels that may potentially fail as well. Upon identifying the known and/or potential entities and pathways that will and/or may fail the controller 4 may be operable to provide application assurance and troubleshooting information to a user of controller 4 (e.g., network operations manager) in order to respond to such a failure in a way that minimizes adverse disruption to a service, and to a customer supported by the data center 10, for example.

As depicted in the simplified block diagram of FIG. 1, the controller 4 may include a graphical user interface (GUI) 5 operable to control the display of one or more virtual nodes of the data center 10, where a virtual node may comprise, for example, a virtual entity 2a, 2b, . . . 2n or sub-entity and a controller (e.g., VSC 7), for example.

The GUI 5 may comprise one or more specially programmed processors (not shown) operable to execute instructions stored in one or more associated memories to complete one or more stored, integrated processes related to the inventive functions and provide the inventive features described herein as well as complete and provide functions and features that are well known to those skilled in the art. For the sake of brevity, the description that follows will not repeatedly refer to the processors and memories though it should be understood that these components may be used to provide the functions and features embodied in examples of the present invention. Alternatively, the GUI 5 may be a part of the controller 4 and, therefore, be controlled by integrated processes stored within controller 4.

As noted above, in accordance with embodiments of the invention one such integrated process enables the GUI 5 to create and then control the display of one or more defined virtual nodes for the data center 10. Each node enables a user of the GUI 5 to manage the components of the data center 10, and any associated sub-nodes or sub-entities with a higher degree of precision compared to existing systems and methods. The virtual nodes may be displayed to a user via a display (not shown) associated with (e.g., connected to), or made a part of, the GUI 5 in order to allow the user to set up a customized network or networks.

In one embodiment the GUI 5 may be operated by a user as follows. The user may "click on" or otherwise select a displayed virtual node using a mouse-like device or keyboard that is connect to, or a part of, the GUI 5, for example, in order to view one or more entities or sub-entities of the selected node. Some examples of displayed nodes are a VSW, Virtual Services Gateway, and a Virtual Routing and Switching Gateway (which accepts appliance connections), to name just a few examples of such nodes.

In additional embodiments, the GUI 5 may be operable to (via execution of a stored, integrated process) control the display of a virtual node and one or more vertical and/or horizontal mesh networks as a single node and/or nodes that are representative of a hardware layer, service layer, including the virtualized entities that may be used to form each layer, for example.

In one embodiment, a particular service provided to a particular customer may be implemented using one VSW. Accordingly, the GUI 5 may be operable to control the display of all of the VMs, other entities, sub-entities, pathways and other connections that are used to provide the particular service as a single node to a user (via execution of a stored, integrated process), thus greatly simplifying the user's ability to monitor the operation of the VMs and other entities and the status of associated pathways that are critical to the provisioning of such a service.

Continuing with our description of FIG. 1, as noted above and herein the controller 4 may receive initial and/or revised information concerning the vertical and horizontal mesh network topology and operation of the data center 10 from a number of different sources, one type of source being one or more agents 3a, 3b, . . . 3n associated with entities 2a, 2b, . . . 2n. In one embodiment, each entity 2a, 2b, . . . 2n may be part of an element (e.g., controller 6, VSC 7, server, other control entity, or other hardware entity) that comprises a computing platform.

Each platform may further comprise one or more specially programmed processors operable to execute instructions stored in one or more associated memories to complete one or more integrated processes related to the inventive functions, and provide the inventive features described herein as well as complete and provide functions and features that are well known to those skilled in the art. For the sake of brevity, the description that follows will not repeatedly refer to the processors and memories though it should be understood that these components may be used to provide the functions and features embodied in examples of the present invention.

For example, the processor(s) and memories may execute one or more stored integrated processes to configure the platform as one or more instantiated virtual entities, and further configure each entity to include a configured agent operable to complete one or more integrated processes as described above and herein. FIG. 1 depicts VSWs and VMs as entities 2a, 2b, . . . 2n. Accordingly, it follows that a computing platform may be operable to configure a given entity 2a, 2b . . . 2n as a VSW, VM (or virtual port). As depicted in FIG. 1, in one embodiment only the VSWs 2a, 2d and 2n are further configured to include an agent. In alternative embodiments, each of the VMs 2b, 2c, 2e and 2f or virtual ports may also be configured to include an agent.

As previously described above and herein each so configured agent may be operable to complete one or more stored, integrated processes, such as collecting initial and revised information associated with one or more instantiated virtual entities, non-virtual entities, hypervisors or control entities and sending the collected information to the controller 4. Examples of such information include, but are not limited to, initial connection information, initial status information, initial tunneling information or some combination of the initial connection, status and tunneling information; and revised connection information, revised status information, revised tunneling information or some combination of the revised connection, status and tunneling information.

It should be understood that the embodiments described above and herein provide various systems and methods to provide information to a controller, such as a service aware management controller. Using one or more of the systems and methods described herein the controller may maintain accurate correlations between various virtual entities, such as between those entities that form a vertical mesh network (e.g., from controller 4 to one or more VSWs 2a, 2d, 2n to one or more VMs 2b, 2c, 2e, 2f to a VM port (not shown) to BGP) and/or a horizontal mesh network (e.g., from one VSW 2a, 2d, 2n to another VSW 2a, 2d, 2n, for example).

The embodiments of the invention described above and herein make it feasible to provide a user with quality assurance levels, up time assurance, and operational statistics that were heretofore unavailable for data centers.

In addition to the embodiments set forth above, the present invention also provides additional embodiments where additional features and functions are provided to a controller, such as controller 4.

For example, in one embodiment a controller 4 may be operable to execute one or more stored, integrated processes for creating or otherwise generating "virtual sites". For example, the controller 4 may generate a virtual site for each VSW, VM or other virtual entity at the same time as a VSW or other entity is created. That is, a VSW or other entity created for tenant services purposes and a corresponding virtual site may be created at the same time by the controller 4 (or by a virtual services tool used to provision virtual entities within the data center 10).

In addition, the controller 4 may be operable to execute one or more stored, integrated processes for creating or otherwise generating and managing virtual tunnels (e.g., VXLAN tunnels) and physical links between the controller 7 and VSWs 2a, 2d, 2n or VMs 2b, 2c, 2e, 2f or between any other virtual or non-virtual entity as needed. Any one of the entities or tunnels created or generated by the controller 4 may be displayed using the GUI 5, for example.

While exemplary embodiments have been shown and described herein, it should be understood that variations of the disclosed embodiments may be made without departing from the scope of the claims that follow.

We claim:

1. A data center monitoring system comprising:
a service aware management (SAM) controller comprising a specially programmed processor operable to electronically execute instructions stored in an associated electronic memory to,
electronically receive information from one or more non-virtual elements of the data center at the SAM controller;
electronically receive information in the form of status and tunneling information from one or more configured agents associated with one or more configured virtual entities of the data center at the SAM controller, the tunneling information defining one or more newly discovered connections between a pair of instantiated virtual entities;
electronically compare the information electronically received from the one or more agents with a stored topology in order to identify the virtual entities and network pathways that have been created or torn down within the data center at the SAM Controller;
electronically parse the electronically received information from the one or more non-virtual elements at the SAM controller to generate, in combination with the identified virtual entities and network pathways, a mesh network topology of the data center, and to correlate the generated data center mesh network topology with one or more services supported by the data center;
electronically parse the electronically received information from the one or more agents and the one or more non-virtual elements at the SAM controller to identify entities, elements and pathways of the generated data center mesh network topology that may be potentially affected by a failure in the data center; and
electronically correlate the potentially identified entities, elements and pathways with the one or more services supported by the data center that may be potentially affected.

2. The system as in claim 1 wherein the information electronically received from the one or more agents further comprises initial connection information, initial status information, and initial tunneling information, including a combination of the initial connection, status and tunneling information.

3. The system as in claim 1 wherein the information electronically received from the one or more agents further comprises revised connection information, revised status information, and revised tunneling information, including a combination of the revised connection, status and tunneling information.

4. The system as in claim 1 wherein the one or more of the non-virtual elements comprise a router, ports of a router or a data center controller.

5. The system as in claim 1 wherein the information electronically received from the one or more non-virtual elements comprises connection, pathway and status information.

6. The system as in claim 1 wherein the SAM controller is further operable to execute instructions stored in an associated memory to:
electronically receive information from one or more hypervisors or control entities of the data center at the SAM controller; and
electronically parse the electronically received information from the one or more hypervisors or control entities at the SAM controller to generate, in combination with the received information from the one or more configured agents, the mesh network topology of the data center, and to correlate the generated data center network topology with the one or more services supported by the data center at the SAM controller.

7. The system as in claim 1 wherein the SAM controller is further operable to execute instructions stored in an associated memory to:
electronically parse the electronically received information from the one or more agents and the one or more non-virtual elements to identify entities, elements and pathways of the generated data center mesh network topology that are known to be affected by a failure in the data center; and
electronically correlate the identified entities, elements and pathways with one or more services supported by the data center that are known to be affected by the failure.

8. The system as in claim 1 wherein the failure is selected from the group consisting of a pathway failure, tunnel failure, virtual entity failure, non-virtual element failure, and a sub-virtual entity failure.

9. The system as in claim 1 further comprising a graphical user interface operable to electronically control the display of one or more virtual nodes of the data center.

10. The system as in claim 9 wherein a virtual node comprises one or more virtual entities of the data center.

11. The system as in claim 1 further comprising a data center element, the data center element comprising:
a computing platform comprising a specially programmed processor operable to execute instructions stored in an associated memory to electronically configure the platform as one or more virtual entities, each virtual entity comprising a configured agent operable to,
electronically collect information comprising at least connection, status, and tunneling information associated with the virtual entity and sub-entities of the virtual entity; and
electronically send the collected information to the SAM controller.

12. The system as in claim 11 wherein data center element comprises a router or server.

13. A method for monitoring a data center using a service aware management (SAM) controller comprising:
electronically receiving information from one or more non-virtual elements of the data center at the SAM controller;
electronically receiving information including at least status information and tunneling information from one or more configured agents associated with one or more configured virtual entities of the data center at the SAM controller, the tunneling information defining one or more newly discovered connections between a pair of instantiated virtual entities;
electronically comparing the information electronically received from the one or more agents with a stored topology in order to identify the virtual entities and network pathways that have been created or torn down within the data center at the SAM controller;
electronically parsing the received information from the one or more non-virtual elements at the SAM controller to generate, in combination with the identified virtual entities and network pathways, a mesh network topology of the data center, and to correlate the generated data center mesh network topology with the one or more services supported by the data center
electronically parse the electronically received information from the one or more agents and the one or more non-virtual elements at the SAM controller to identify entities, elements and pathways of the generated data center mesh network topology that may be potentially affected by a failure in the data center; and
electronically correlate the potentially identified entities, elements and pathways with the one or more services supported by the data center that may be potentially affected.

14. The method as in claim 13 wherein the information electronically received from the one or more agents further comprises initial connection information, initial status information, and initial tunneling information, including a combination of the initial connection, status and tunneling information.

15. The method as in claim 13 wherein the information electronically received from the one or more agents further comprises revised connection information, revised status information, and revised tunneling information, including a combination of the revised connection, status and tunneling information.

16. The method as in claim 13 wherein the one or more of the non-virtual elements comprises a router, ports of a router or a data center controller.

17. The method as in claim 13 wherein the information electronically received from the one or more non-virtual elements comprises connection pathway and status information.

18. The method as in claim 13 further comprising:
electronically receiving information from one or more hypervisors or control entities of the data center at the SAM controller; and
electronically parsing the received information from the one or more hypervisors or control entities at the SAM controller to generate, in combination with the received information from the configured agents, the mesh network topology of the data center, and to correlate the generated data center mesh network topology with the one or more services supported by the data center.

19. The method as in claim 13 further comprising:
electronically parsing the electronically received information from the one or more agents and the one or more non-virtual elements at the SAM controller to identify entities, elements and pathways of the generated data center mesh network topology that may be potentially affected by a failure in the data center; and
electronically correlating the potentially identified entities, elements and pathways with one or more services supported by the data center that may be potentially affected at the SAM controller.

20. The method as in claim 19 wherein the failure is selected from the group consisting of a pathway failure, tunnel failure, virtual entity failure, non-virtual element failure, and a sub-virtual entity failure.

21. The method as in claim 13 further comprising electronically controlling the display of one or more virtual nodes of the data center at the SAM controller.

* * * * *